United States Patent
Zahradnik

[15] 3,656,675
[45] Apr. 18, 1972

[54] FILM CARTRIDGE GUIDE ASSEMBLY
[72] Inventor: George J. Zahradnik, Wheaton, Ill.
[73] Assignee: A. B. Dick Company, Chicago, Ill.
[22] Filed: June 19, 1970
[21] Appl. No.: 47,660

[52] U.S. Cl. ............................................. 226/89, 352/72
[51] Int. Cl. ........................................................ G03b 1/56
[58] Field of Search ................................. 352/72, 74–78; 242/197–200, 194; 226/89–91; 312/91

[56] References Cited

UNITED STATES PATENTS 2,504,317  4/1950  Frankel..................................352/74
3,362,774  1/1968  Easterly................................352/72
3,488,112  1/1970  Hickl....................................352/72

*Primary Examiner*—Richard A. Schacher
*Attorney*—Johnson, Dienner, Emrich, Verbeck & Wagner

[57] ABSTRACT

In a movie projector designed to receive and operate with a film cartridge, where the film cartridge housing is constructed with guiding surfaces that cooperate with complementary guide surfaces in the cartridge receptacle of the movie projector to cause the cartridge to follow a predetermined path when inserted or removed from the receptacle in order that the film cartridge will always be brought into a proper operating relationship with the various operating components of the movie projector.

12 Claims, 9 Drawing Figures

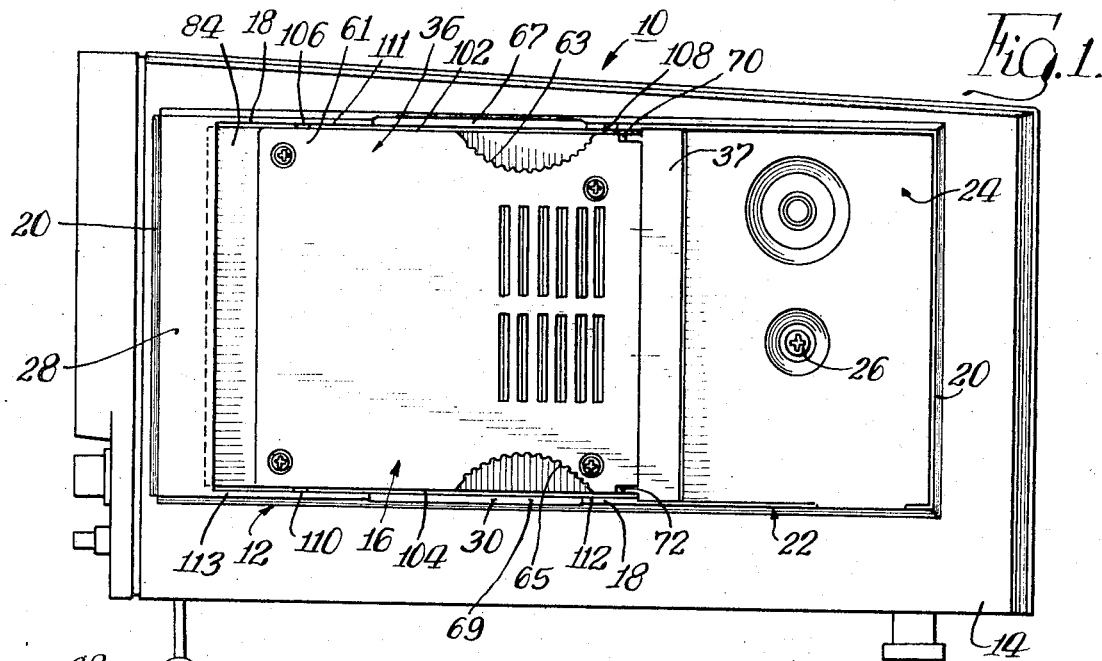
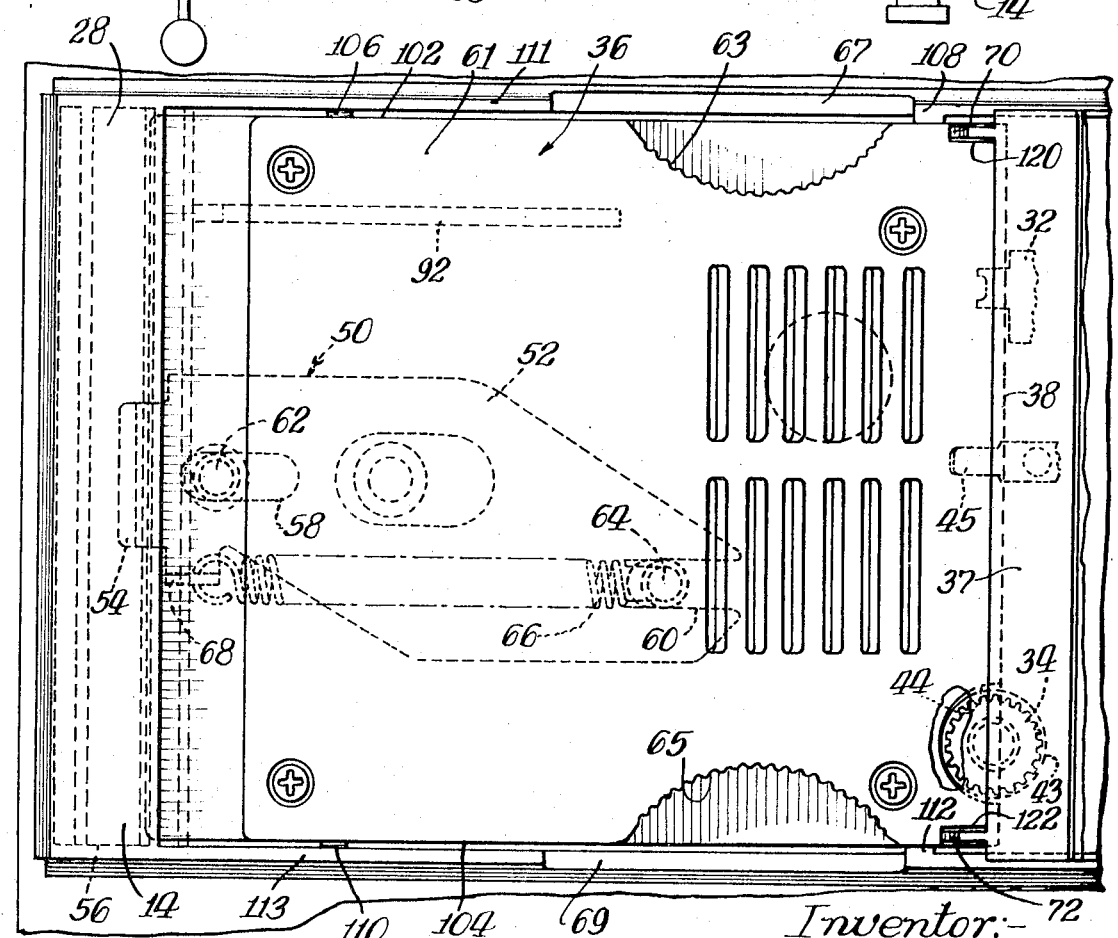

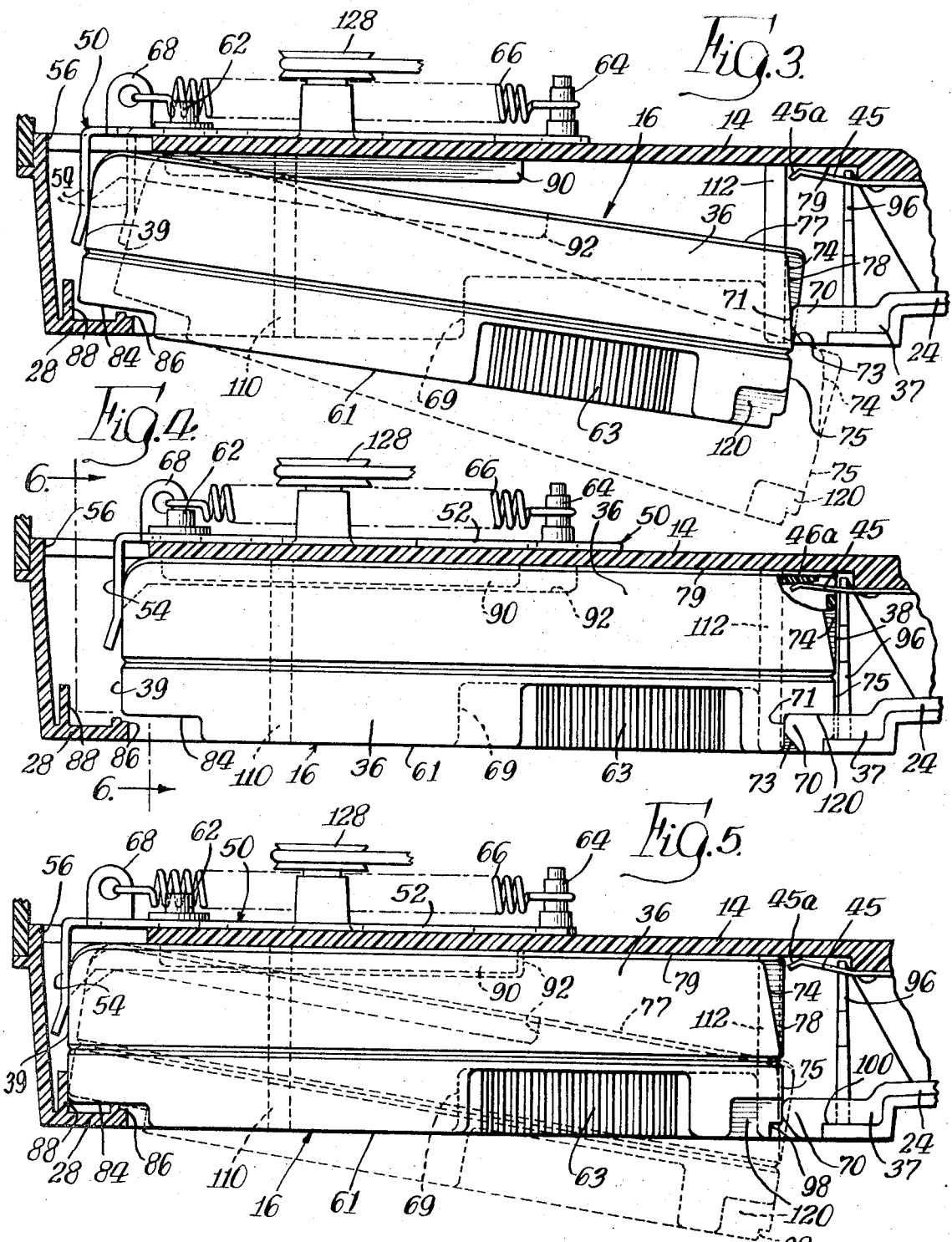

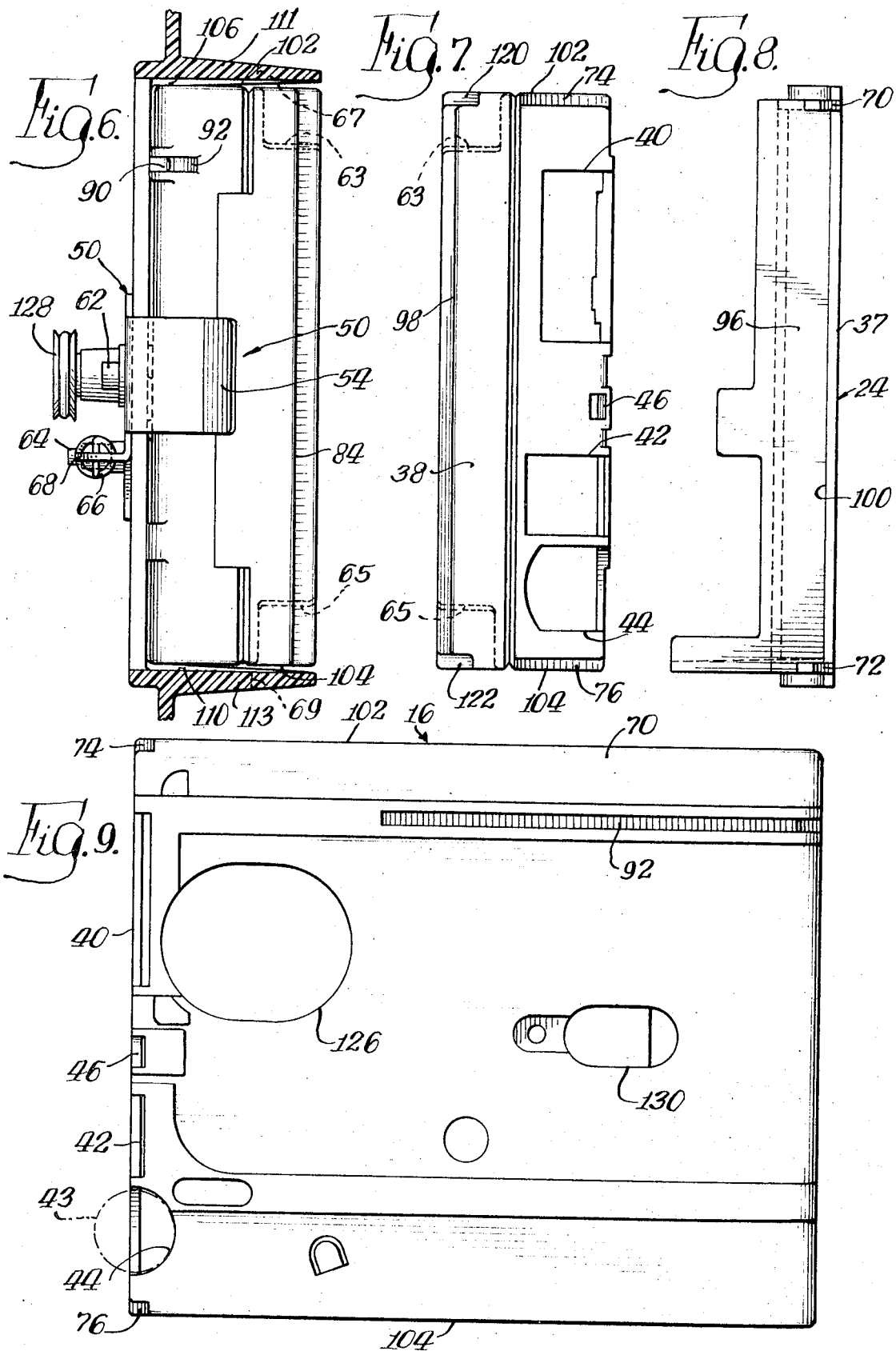

3,656,675

FILM CARTRIDGE GUIDE ASSEMBLY

BACKGROUND OF THE INVENTION

This invention relates to a movie projector of the type which operates a film cartridge and which is intended to be used as a teaching aid in the showing of training films.

In the design of this type of movie projector, careful consideration must be given to the fact that the operator will on many occasions be unskilled and might even be a child. One of the difficult tasks in operating a movie projector is, of course, the insertion and removal of a film reel. The use of film cartridge has greatly simplified this operation, but it is still possible to damage the film if the cartridge is improperly inserted into the projector.

Accordingly, one object of this invention is to provide a movie projector housing having a receptacle for receiving a film cartridge, where the receptacle and film cartridge housing are constructed with mating guide surfaces which cooperate to prevent damage to the film during the loading and unloading of the film cartridge.

Another object of this invention is to provide a movie projector housing having a receptacle for receiving a film cartridge, where the receptacle and film cartridge housings are constructed with mating guide surfaces which cause the cartridge to follow a predetermined path when inserted or removed from the receptacle to thereby smoothly, with a minimum of wear to the film, bring the film cartridge into proper operating relationship with the various operating components of the movie projector.

SUMMARY OF THE INVENTION

A motion picture projector housing is constructed with a cartridge receptacle formed on one of its side walls. Also, this side wall carries the various operating components of the projector, including a claw drive mechanism and a film feed sprocket. The film picker of the claw drive mechanism and the film feed sprocket are aligned in a straight line relative to the cartridge receptacle and disposed in the direct path of the front wall of the film cartridge, which has corresponding openings for receiving the film picker and film feed sprocket.

In the exemplary embodiment, by having the length of the receptacle opening for the cartridge smaller than the length of the film cartridge, the cartridge has to be inserted endwise, and once inserted, some holding action is thereby provided for the cartridge. At the forward end of the cartridge receptacle the film picker and feed sprocket are located adjacent the margin of the receptacle opening. At the rearward end of the cartridge receptacle, there is provided a spring-biased lever for urging the firm cartridge forwardly towards the film picker and feed sprocket.

To install the film cartridge in the cartridge receptacle, its rear end is inserted through the cartridge receptacle opening and pushed rearwardly against the spring-biased lever until the front end of the film cartridge clears the forward end of the receptacle opening. Upon clearing the forward end, the spring-biased lever urges the cartridge forwardly into operative engagement with the film picker and feed sprocket.

To insure that the film cartridge is correctly and smoothly brought into operating engagement with the projector's operating components and to avoid scratching or other damage to the film, the film cartridge and film cartridge receptacle have a number of mating guide surfaces that cause the film cartridge to follow the same path during its insertion and removal. In the exemplary embodiment one set of these guide surfaces is provided by a pair of cam surfaces on the forward end of the cartridge receptacle that cooperates with cam follower surfaces on the front end of the film cartridge to cause the forward end of the cartridge to swing inwardly as the cartridge is inserted and prevent its forward motion until the cartridge is in direct alignment with the projector's operating components.

BRIEF DESCRIPTION OF DRAWING

There is shown in the accompanying drawing, the preferred embodiment of this invention, in which:

FIG. 1 is a side elevational view of a motion picture projector having a film cartridge receptacle provided on its side wall and a cartridge contained therein;

FIG. 2 is an enlarged view of the film cartridge receptacle depicted in FIG. 1 with the film cartridge inserted therein;

FIGS. 3, 4 and 5 are top cross sectional views of the film cartridge receptacle illustrating various positions of a film cartridge relative to the receptacle;

FIG. 6 is a cross sectional view taken along the line 6–6 of FIG. 4 and looking in the direction of the arrows;

FIG. 7 is a front elevational view of a film cartridge having an upper and lower cam follower surfaces;

FIG. 8 is a front elevational view of a part of the film cartridge receptacle having an upper and lower cam surfaces which mate with the cam surfaces of the film cartridge illustrated in FIG. 7; and FIG. 9 is a side elevational view of the inside wall of the film cartridge illustrated in FIG. 7.

DESCRIPTION OF PREFERRED EMBODIMENT

For the purposes of illustrating this invention, the preferred embodiment is illustrated in FIG. 1 as a motion picture projector 10 having a film cartridge receptacle 12 formed on the outside surface of one of its side walls 14 for receiving a film cartridge 16 therein.

Integrally formed and extending perpendicular from the side wall 14 of movie projector 10 are two generally parallel walls 18 and two parallel walls 20 which are perpendicular to walls 18, and are joined together at their ends to form a rectangular shaped structure 22. Covering the right end (as viewed in FIG. 1) of the rectangular-shaped structure 22 is a cover plate 24, which is held in place by a screw 26 threaded into side wall 14 (not shown). Across the left hand end of the rectangular shaped structure 22 is a narrow strip 28 which together with the cover plate 24 and the parallel walls 18 define a generally rectangular shaped opening 30 for the film cartridge receptacle 12.

The side wall 14 of the motion picture projector 10 also supports the various film projecting components of the motion picture projector, including a film picker 32 (FIG. 2) of an intermittent film drive mechanism (not shown) and a film feed sprocket 34 (FIG. 2), which are disposed in parallel alignment with the flange 37 of cover plate 24. Also, a sound head could be disposed between the picker 32 and the film drive 34 if the motion picture projector 10 were to include sound transmission.

The film cartridge 16 has a shallow box-shaped housing or casing 36 in which is contained a motion picture film having a spiral row portion containing many convolutions wound about a reel and an exhibition portion consisting of a single strip of film. The manner in which the motion picture film is contained in the housing 36 and driven by the motion picture projector 10 is not important for the purposes of this invention, except the fact that the exhibition portion of the film passes along the front wall 38 of the film cartridge housing. One example of the manner in which the film is contained within the film cartridge housing and cooperates therewith is disclosed in the co-pending patent application of Otto R. Nemeth, U.S. Pat. Ser. No. 722,646, entitled Film Handling System, which is assigned to the same assignee as this invention.

As shown in FIG. 7, there is provided in the front wall 38 of the film cartridge housing 36, film projection openings including an upper elongated opening 40 for receiving a film picker and a lower opening 44 for receiving the film feed sprocket 34 when the film cartridge 16 is inserted in the film cartridge receptacle 12.

From the foregoing description, it will become apparent that upon the insertion or removal of the film cartridge housing 36, its front wall 38 must be moved into and away from the film picker 32 and feed sprocket 34 in a straight direction to prevent any damage to the film.

The film cartridge 16 is urged and held in operative engagement with the film picker 32 and feed sprocket 34 by a spring-biased lever 50 mounted on the inside wall surface of side wall 14 of movie projector 10, and a spring finger 45 mounted on side wall 14 adjacent the forward end of receptacle opening 30, the finger 45 being adapted to engage on aperture 46 provided in cartridge front wall 38. The spring-biased lever 50 is constructed as a one-piece member having a mounting portion 52 and a cartridge engaging portion 54 extending perpendicular from the mounting portion 52 through an opening 56 in the side wall 14. The mounting portion 52 is slidably mounted on the inside surface of side wall 14 by means of two slots 58, 60 formed at opposite ends of the mounting portion 52 that cooperate, respectively, with a pair of mounting studs 62, 64 to guide the cartridge engaging portion 54 in a generally forward direction relative to cartridge receptacle 12. The cartridge engaging portion 54 is constantly urged towards the flange 37 of cover member 24 through the action of a spring 66 under tension stretched between mounting stud 64 and hook 68 on the mounting portion 52. Turning to the structure for holding the forward end of the cartridge in place, it includes the spring finger 45 having an inclined tip 45a adapted to ride up onto an inclined toe portion 46a of the cartridge inside wall as the cartridge is biased toward the film projecting apparatus. (See FIGS. 3, 4 and 5).

Referring to the latter figures, it can be appreciated that the length of the cartridge housing 36 between its front and rear walls 38, 39 is substantially longer than the length of the opening 30 of receptacle 12 between its forward and rearward ends. Thus, it is necessary for the user to first insert the rear end of cartridge 16 and to push the rear wall 39 of the cartridge 16 against the spring biased lever 50 until the front wall 38 can swing past the forward end of opening 30, at which time, the cartridge engaging portion 54 under the urging of spring 66 will push the cartridge 16 forwardly into operative engagement with the film picker 32, feed sprocket 34, and also spring finger 45. The latter is operative to hold the cartridge so as to prevent lateral movement of that end of the cartridge, once it is installed.

To assist the user in inserting the film cartridge 16 into the cartridge receptacle 12, the outside wall member 61 of cartridge housing 36 is provided with an upper and lower arcuate recesses 63, 65 that can be readily grasped by the user, and the parallel horizontal walls 18 have upper and lower rectangular cut-outs 67, 69 that overlap the respective arcuate recesses 63, 65 as the cartridge is inserted into receptacle 12.

As will now be explained, to insure that the film cartridge 16 is always properly inserted and removed with respect to the receptacle 12 the film cartridge housing 36 and film cartridge receptacle 12 have a number of mating surfaces to guide the film cartridge 16 along a predetermined path.

Two of these mating surfaces are provided by upper and lower cam surfaces 70, 72 formed on flange 37 of cover plate 24 which are engaged by upper and lower cam follower surfaces 74, 76, respectively, formed across the upper and lower edges of the front wall 38 of film cartridge housing 36. As can be seen by referring to FIGS. 3 and 4 of the exemplary embodiment, the cam follower surfaces 74, 76 ride along the respective cam surfaces 70, 72 as the cartridge 16 is inserted into the receptacle 12 preventing the front wall 38 of the film cartridge housing 36 from moving forwardly until the inside surface 77 of cartridge housing 36 is adjacent the back wall 79 of cartridge receptacle 12. As a consequence of this cooperating action between the cam surfaces 70, 72 and the cam follower surfaces 74, 76, it is impossible for the film cartridge 16 to move forward towards the film projecting mechanism or apparatus, exemplarily shown as the film picker 32 and feed sprocket 34 prior to the front wall 38 being suitably aligned. In the present instance the alignment assures that the cartridge film projection openings and the receptacle film projecting mechanism engage and disengage without damaging or causing undue wear to the film. Similarly, as illustrated in FIG. 5, it is impossible to remove the film cartridge 16 out of the film cartridge receptacle 12 and away from the back wall 79 until the outer margin of the cam follower surfaces 74, 76 clear the edge of cam surfaces 70, 72. Consequently, these mating surfaces require that the front wall 38 of film cartridge housing 36 will always be guided straight into the opening between flange 37 and side wall 14.

The upper and lower cam surfaces 70, 72 are identical in shape and as is depicted in FIGS. 3 – 5, have a straight portion 71 and a slanting portion 73. Likewise, the upper and lower cam follower surfaces 74, 76 are identical in shape and have a straight portion 75 and a slanting portion 78. As the rear end of cartridge 16 is inserted into receptacle 12 (see dotted lines of FIG. 3), the slanting portions 73 of cam surfaces 70, 72 are engaged by the inside wall 77 of film cartridge which guide the forward end of cartridge 16 rearwardly. Further inward movement of cartridge 16 causes slanting portions 78 of cam follower surfaces 74, 76 to ride first along slanting portions 73 and then along straight portions 71 of cam surfaces 70, 72, with the result that the front end of cartridge 16 swings rearwardly and towards back wall 79. Finally, straight portions 75 of cam follower surfaces 74, 76 ride along straight portions 71 of cam surfaces 70, 72 causing the front end of cartridge 16 to move straight towards back wall 79 of receptacle 12.

Provided at the upper and lower edges at the outside corners of front wall 38 (FIG. 2) of the cartridge housing 36, are upper and lower recesses 120, 122 which are in the plane of the upper and lower cam follower surfaces 74 and 76, respectively. When the inside wall 77 of cartridge 16 engages receptacle back wall 79, the upper and lower cam surfaces 70, 72 are in alignment with upper and lower recesses 120, 122, and consequently cartridge 16 is free to move forwardly under the biasing action of lever 50.

The left end of the outside side wall 61 of film cartridge housing 36 is recessed at 84. This recess 84 slides along the outer lip 86 (see FIGS. 3 – 5) of narrow strip 28 as the film cartridge 16 is inserted into the film cartridge receptacle 12. As illustrated in FIG. 5, the corner defined by the rear wall 39 and the outside side wall 61 of film cartridge housing 36 engages and is guided by a rib 88 extending from narrow strip 28 as the front end of the film cartridge 16 is swung towards and away from the back wall 79 of the cartridge receptacle 12.

As the cartridge 16 is inserted into receptacle 12, the inside side wall surface 77 of film cartridge housing 36 is brought into sliding engagement with the side wall 14 of the movie projector 10 and then the spring-biased lever 50 urges the film cartridge 16 forwardly towards the cover plate 24. During this forward movement, the cartridge 16 is guided in a straight path by the cooperating action between a long narrow rib 90 formed on the outside surface of back wall 79 and a long narrow slot 92 (FIG. 9) formed in the inside side wall surface 70 of cartridge housing 36 having a width slightly larger than the width of the long narrow rib 90.

There is also provided upper and lower guide surfaces formed in the film cartridge receptacle 12 for guiding the upper and lower side walls 102, 104 of cartridge housing 36 as the cartridge 16 is moved towards and away from the film picker 32 and feed sprocket 34, and the guide surfaces comprise a pair of upper skids 106, 108 and a pair of lower skids 110, 112 formed, respectively, on the upper and lower walls 111, 113 of cartridge receptacle 12. As shown in FIG. 6, the four skids 106, 108, 110 and 112 taper inwardly towards the outside of cartridge receptacle 12 so that only the inside edge of the upper and lower walls 102, 104 of cartridge housing 36 are in sliding engagement to effectively reduce the friction therebetween.

The forward movement of film cartridge housing 36 is stopped when film feed sprocket opening 44 engages film feed sprocket projecting boss 43 (FIG. 2) emanating from back wall 79 of projector side wall 14 as depicted in FIG. 2. It is recognized that other fixed appendages mounted on interior surfaces of film cartridge receptacle 12 or cover plate 24 could engage other areas of film cartridge housing 36 to effectively block the forward movement of film cartridge 16 similarly to the manner depicted. In this stop position, any lateral movement of the front wall 38 of film cartridge 16 is limited by the abutting relationship between the recess 98 (FIG. 7) formed along the corner of the front wall 38 and the outside side wall 61 and the lip 100 (FIG. 5) formed by the intersection of flange 37 and wall 96. The spring finger 45 cooperates with aperture 46 to hold the wall 38 and that end of the cartridge against lateral movement, which otherwise may be permitted by the tolerances in the fit of parts.

From the foregoing description, it is apparent that during the loading and unloading of the cartridge 16, the cartridge housing 36 is guided through a predetermined path (as depicted in the FIG. 3 through 5 showings). The rear wall 39 of cartridge housing 36 is first inserted in the rearward end of cartridge receptacle 12 and is engaged by the cartridge engaging portion 54 of spring-biased lever 50. As the cartridge 16 is pushed further into the receptacle 12, the rear wall 39 pushes the cartridge engaging portion 54 rearwardly against the biasing force of spring 66, and simultaneously front wall 38 is swung towards the back wall 79 of receptacle 12 through the guiding action provided by upper and lower cam follower surfaces 74, 76 riding along upper and lower cam surfaces 70, 72.

During this swinging motion of cartridge 16 towards back wall 79 of receptacle 12, the lamp housing (not shown) mounted on the back wall 79 projects through lamp aperture 126 (FIG. 9) in the inside wall 70 of cartridge housing 36 and a flexible drive member (not shown but extending through an opening in back wall 79 from drive shaft 128 of FIGS. 3-5) projects through aperture 130 (FIG. 9) in the inside wall 70 of cartridge housing 36 for driving the row portion of the film contained in cartridge 16.

Upon the inside wall 70 of cartridge housing 36 being brought into sliding engagement with back wall 79 of receptacle 12, the cartridge 16 is free to move forwardly and it does so under the urging of spring-biased lever 50. During this forward movement, the cartridge 16 is guided by the upper and lower skids 106, 108 and 110, 112 and by the elongated rib 92 directly towards the film picker 32 and feed sprocket 34. The front wall 38 is prevented from any lateral movement by the interfit of the receptacle supported spring finger 45 acting against the cartridge rear wall 77 by way of aperture 46.

While the invention has been described in connection with one specific embodiment, it is to be understood that this is by way of illustration and not by way of limitation. The scope of the invention is defined solely by the appended claims which should be construed as broadly as the prior art will permit.

I claim:

1. In a film projecting system including a projector having a receptacle formed with an opening adapted to receive a film cartridge, the film cartridge adapted to be received in the cartridge receptacle having a plurality of walls defining an enclosure for the film carried therein with one wall having an opening permitting operative access for effecting projection of film contained therein, the film projecting apparatus adapted to mechanically engage the film and being mounted adjacent the margin of said receptacle opening, and means for biasing said cartridge into engagement with said film projecting apparatus, the improvement comprising a guide means carried by an inside one of said cartridge receptacle enclosure defining walls and follower means carried by said film cartridge and complementarily shaped to matingly receive said guide means, said follower means engageable with said guide means to permit relative movement between the film and film projecting apparatus along a predetermined path at all times that the film and film projecting apparatus are brought into engagement and taken out of engagement, the film receptacle access opening having a width sufficient to receive the cartridge and a length shorter than the cartridge, the latter preventing engagement of the film and film projecting apparatus until said guide means and follower means, respectively, are matingly engaged so that the cartridge carrying the film can only travel relative to the projector along said predetermined path for operative engagement of the film and the projecting apparatus.

2. The combination of claim 1, wherein said guide means carried by said cartridge receptacle comprises a first and second guide means and said follower means carried by said film cartridge comprises a first and second follower means, where said first follower means cooperates with said first guide means to prevent said one wall of said cartridge from moving into operative engagement with said film projecting apparatus prior to a predetermined alignment therewith being effected, and where said second follower means cooperates with said second guide means to direct said one wall of said cartridge straight into operative engagement with said film projecting apparatus as said biasing means urges said cartridge into engagement with said film projecting apparatus.

3. The combination of claim 2, wherein said first means comprises a pair of cam surfaces extending into said receptacle opening and wherein said first follower means comprises a pair of cam follower surfaces formed in said film cartridge and adapted to ride along said pair of cam surfaces to guide said one wall so as to prevent sliding contact between said film and said receptacle as said cartridge is inserted and is pushed against said biasing means.

4. The combination of claim 2, wherein said second guide means includes an elongated rib extending from one of the walls of said cartridge in a straight direction towards said film projecting apparatus and said second follower means includes an elongated slot formed in an inside one of said plurality of said cartridge walls having a width adapted to receive said elongated rib and in alignment therewith when said cartridge is contained in said receptacle.

5. The combination of claim 1, the improvement further comprising a means for holding said one end of said cartridge in place upon said cartridge being brought into engagement with said film projecting apparatus so as to prevent any lateral movement of said one end.

6. The combination of claim 5, wherein said holding means comprises a spring finger being mounted adjacent said receptacle opening and an aperture formed in said one wall of said cartridge in alignment with the free end of said spring finger to receive said free end when said cartridge moves into engagement with said film projecting apparatus, where said free end urges said one end of said cartridge against a wall of said receptacle.

7. In a motion picture projector having a film cartridge receptacle formed on the outer surface of one wall that supports operative components of the projector, the film cartridge adapted to be received in the cartridge receptacle having a plurality of walls defining an enclosure for the film carried therein with a forward one of said walls having a film picker opening and a film feed sprocket opening, the film picker and film feed sprocket being mounted adjacent the margin of said film receptacle opening at said forward end, and a spring-biased lever mounted on said one wall adjacent the margin of said receptacle opening at said rearward end, the improvement comprising guide means carried by said cartridge receptacle and follower means carried by said film cartridge that cooperate with said guide means to prevent said front wall of said film cartridge from moving into operative engagement with said film picker and said feed sprocket prior to a predetermined alignment therewith being effected.

8. The combination of claim 7, wherein the improvement further comprises a second guide means carried by said cartridge receptacle to direct said forward wall of said film cartridge straight into operative engagement with said film picker and said feed sprocket as said spring-biased lever urges said film cartridge toward said forward end of said receptacle.

9. The combination of claim 8, wherein said second guide means includes an elongated rib extending from a back wall of said cartridge receptacle in a generally perpendicular direction to an imaginary line connecting said film picker and said feed sprocket and wherein said inside wall of said cartridge includes an elongated slot formed in an inside one of said plurality of cartridge walls having a width adapted to receive said elongated rib and in alignment therewith when said cartridge is contained in said receptacle.

10. The combination of claim 7, wherein said guide means comprises upper and lower cam surfaces formed at said forward end of said cartridge receptacle and extending into said receptacle opening and wherein said follower means comprises upper and lower cam follower surfaces formed in said film cartridge and adapted to ride along said upper and lower cam surfaces to guide said forward wall so as to prevent sliding contact between said film and said receptacle as said cartridge is inserted and is pushed against the biasing force of said spring-biased lever.

11. The combination of claim 7, wherein the improvement further comprises a means for holding said one end of said cartridge in place upon said cartridge being brought into engagement with said film projecting apparatus so as to prevent any lateral movement of said one end.

12. The combination of claim 11, wherein said holding means comprises a spring finger being mounted adjacent said receptacle opening and an aperture formed in said one wall of said cartridge in alignment with the free end of said spring finger to receive said free end when said cartridge moves into engagement with said film projecting apparatus, where said free end urges said one end of said cartridge against a wall of said receptacle.

* * * * *